US010738654B2

(12) United States Patent
Pikovsky et al.

(10) Patent No.: US 10,738,654 B2
(45) Date of Patent: Aug. 11, 2020

(54) LUBRICATING-OIL COLLECTION CAP FOR TURBOMACHINE EQUIPMENT

(71) Applicant: SAFRAN AIRCRAFT ENGINES, Paris (FR)

(72) Inventors: Catherine Pikovsky, Moissy-Cramayel (FR); Benoit Guillaume Farvacque, Moissy-Cramayel (FR); Serge René Morreale, Moissy-Cramayel (FR); Mathieu Jean Pierre Trohel, Moissy-Cramayel (FR)

(73) Assignee: SNECMA, Paris (FR)

( * ) Notice: Subject to any disclaimer, the term of this patent is extended or adjusted under 35 U.S.C. 154(b) by 249 days.

(21) Appl. No.: 15/521,854

(22) PCT Filed: Oct. 13, 2015

(86) PCT No.: PCT/FR2015/052757
§ 371 (c)(1),
(2) Date: Apr. 25, 2017

(87) PCT Pub. No.: WO2016/066919
PCT Pub. Date: May 6, 2016

(65) Prior Publication Data
US 2017/0241290 A1    Aug. 24, 2017

(30) Foreign Application Priority Data

Oct. 28, 2014  (FR) ...................... 14 60353

(51) Int. Cl.
*F04D 29/08*   (2006.01)
*F01D 25/18*   (2006.01)
(Continued)

(52) U.S. Cl.
CPC ............... *F01D 25/18* (2013.01); *F02C 7/06* (2013.01); *F16H 57/048* (2013.01);
(Continued)

(58) Field of Classification Search
CPC ......... F04D 29/167; F01D 9/065; F01D 25/24
(Continued)

(56) References Cited

U.S. PATENT DOCUMENTS 5,538,258 A  *  7/1996  Hager ................... F16J 15/164
                                                         277/423
8,857,149 B1 * 10/2014  Muldoon ................. F02C 7/06
                                                         60/39.08
(Continued)

FOREIGN PATENT DOCUMENTS

CN    101680527 A    3/2010
CN    102812209 A    12/2012
(Continued)

OTHER PUBLICATIONS

Chinese Office Action dated Jul. 23, 2018, issued in corresponding Chinese Application No. 201580058050.8, with English Translation, 10 pages.
(Continued)

*Primary Examiner* — John Kwon
(74) *Attorney, Agent, or Firm* — Christensen O'Connor Johnson Kindness PLLC

(57) ABSTRACT

An annular cap for collecting lubricating oil for turbomachine equipment is configured to extend around the equipment and to rotate about an axis. The cap includes through-orifices through which the oil can pass radially under the effect of spinning. The cap further includes means of deflecting the oil leaving the orifices in a direction substantially transverse to the axis and substantially tangential to the cap.

24 Claims, 2 Drawing Sheets

(51) Int. Cl.
*F02C 7/06* (2006.01)
*F16N 31/00* (2006.01)
*F16H 57/04* (2010.01)

(52) U.S. Cl.
CPC ......... *F16H 57/0482* (2013.01); *F16N 31/00* (2013.01); *F05D 2260/40311* (2013.01)

(58) Field of Classification Search
USPC .................................. 415/110–113; 184/6.13
See application file for complete search history.

(56) References Cited

U.S. PATENT DOCUMENTS

| | | | | |
|---|---|---|---|---|
| 2006/0138779 | A1* | 6/2006 | Bouiller | F01D 15/10 290/52 |
| 2010/0236347 | A1 | 9/2010 | Kuwamoto et al. | |
| 2011/0150380 | A1* | 6/2011 | Walter | F16C 33/7863 384/484 |
| 2013/0190160 | A1* | 7/2013 | Yumoto | B04B 1/20 494/15 |
| 2015/0104123 | A1* | 4/2015 | Ertas | F01D 25/164 384/119 |
| 2017/0051823 | A1* | 2/2017 | Pikovsky | F02C 7/06 |
| 2017/0234213 | A1* | 8/2017 | Futae | F02B 39/14 415/110 |
| 2017/0370288 | A1* | 12/2017 | Uhkoetter | F02C 7/06 |
| 2018/0016929 | A1* | 1/2018 | Accary | F01D 11/02 |
| 2018/0195416 | A1* | 7/2018 | Jouy | F01D 9/065 |

FOREIGN PATENT DOCUMENTS

| | | |
|---|---|---|
| CN | 103486234 A | 1/2014 |
| EP | 1 245 793 A1 | 2/2002 |
| EP | 2 672 148 A1 | 12/2013 |
| EP | 2719927 A1 | 4/2014 |
| FR | 2974143 A1 | 10/2012 |
| JP | 2004324594 A | 11/2004 |
| WO | 2014123704 A1 | 8/2014 |

OTHER PUBLICATIONS

Written Opinion of the International Searching Authority dated Jan. 18, 2016, issued in corresponding International Application No. PCT/FR2015/052757, filed Oct. 13, 2015, 6 pages.
International Preliminary Report on Patentability dated May 2, 2017, issued in corresponding International Application No. PCT/FR2015/052757, filed Oct. 13, 2015, 1 page.
International Search Report dated Jan. 18, 2016, issued in corresponding International Application No. PCT/FR2015/052757, filed Oct. 13, 2015, 5 pages.
Written Opinion of the International Searching Authority dated Jan. 18, 2016, issued in corresponding International Application No. PCT/FR2015/052757, filed Oct. 13, 2015, 5 pages.

* cited by examiner

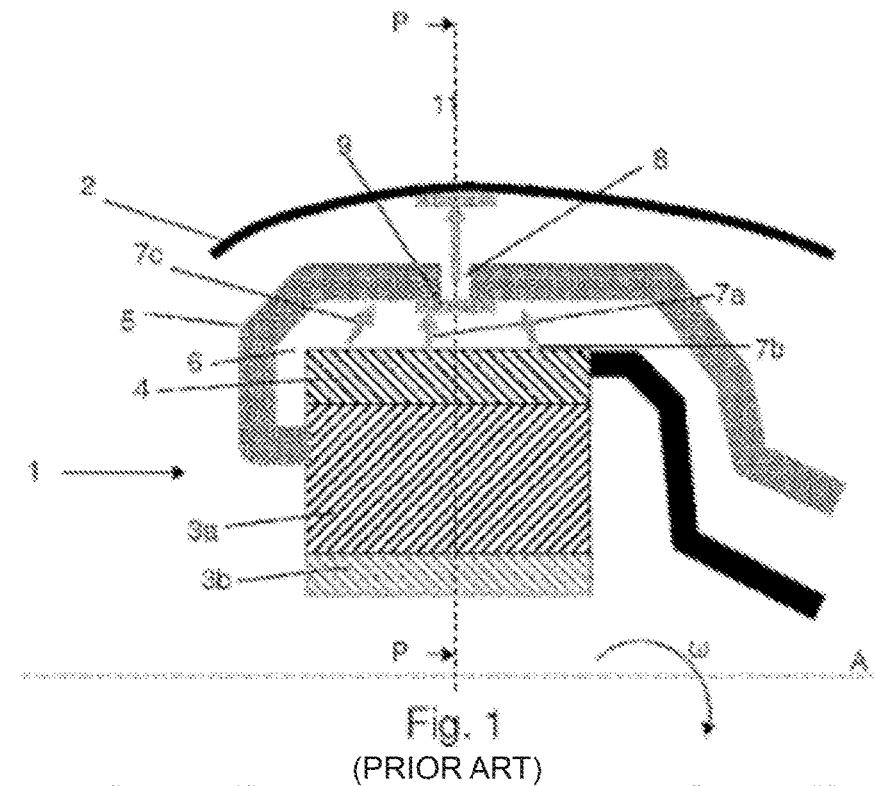
Fig. 1
(PRIOR ART)
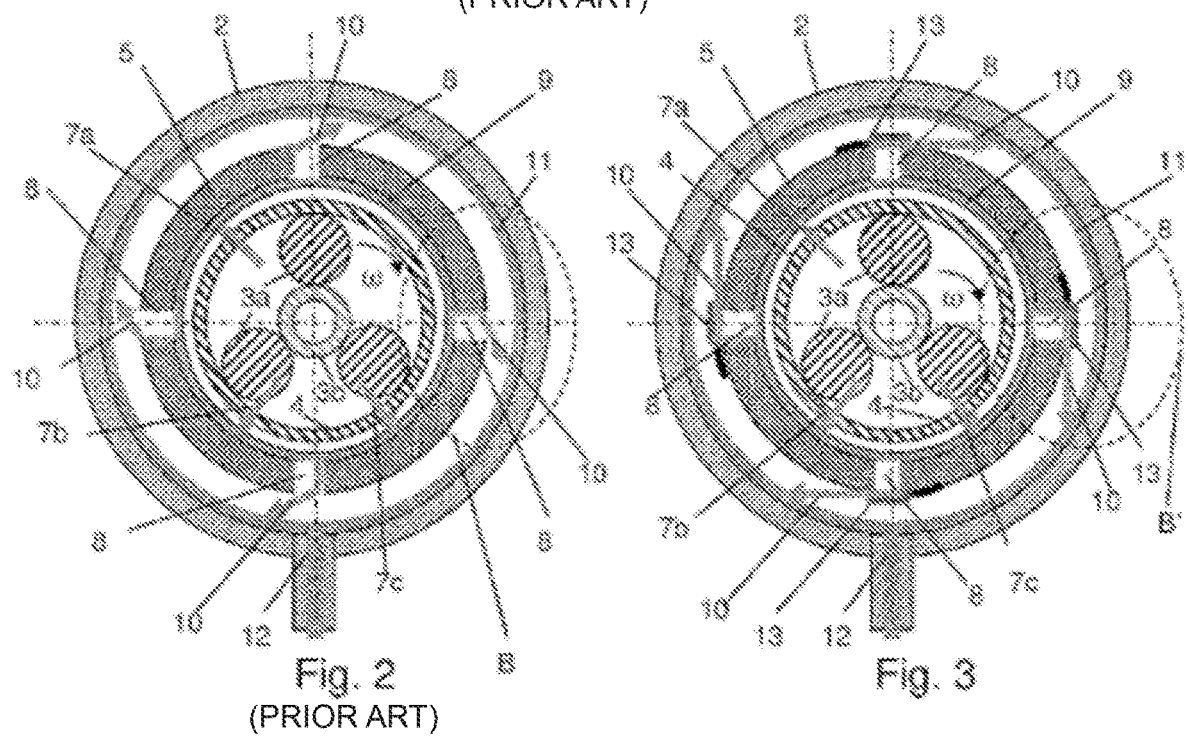
Fig. 2
(PRIOR ART)
Fig. 3

LUBRICATING-OIL COLLECTION CAP FOR TURBOMACHINE EQUIPMENT

FIELD AND BACKGROUND OF THE INVENTION

The present invention relates to the field of lubrication for aircraft engines. It more particularly relates to a device for collecting oil that has been used by a piece of equipment including a rotary part.

For example, a turboprop with counter-rotating propellers may include a power gear box (PGB) whose planet gear support rotates inside a static enclosure.

The planet gear support forms a cap around the rolling bearings and gears of the PGB. The oil injected continuously into the PGB lubricates and cools the rolling bearings and gears before being sprayed by centrifugation against the planet gears support. The planet gear support includes orifices through which this oil can escape toward the static enclosure, which serves as a collection enclosure to return the oil into the lubrication circuit.

The PGB requires a large quantity of oil. For effective oil collection toward the oil discharge means of the enclosure and to avoid clogging, it is important to guide the jets leaving the orifices of the planet gear support such that the oil sprayed against the wall of the enclosure forms a ring driven in a rotating overall movement. The more stable the spring is, the fewer splashes there are, and the better the oil recovery is in the enclosure.

The oil passage orifices in the planet gear support are generally oversized to avoid a risk of oil accumulation in the rotary part. In so doing, the section of these orifices does not correspond to the section of the oil jet that traverses them. It is then difficult to predict the radial component of the jet leaving the orifices, and therefore to control its direction. Under these conditions, the development of an effective oil collection system in the static enclosure is problematic, at least in the case of reduction gears requiring a high lubrication flow rate.

The present invention aims to propose a simple solution for effectively collecting the oil flow leaving a piece of equipment, in particular a piece of equipment rotating in a lubricating enclosure.

BRIEF DESCRIPTION OF THE INVENTION

To that end, the invention relates to an annular cap for collecting lubricating oil for turbomachine equipment, said cap being configured to extend around said equipment and to rotate around an axis, the cap including through orifices through which the oil can pass radially under the effect of spinning, characterized in that it includes means for deflecting the oil leaving said orifices, arranged to give it an exit speed oriented in a direction substantially transverse to the axis and substantially tangential, i.e., perpendicular, to the radial direction, at said outlet.

In the present document, the terms "radial" and "transverse" refer to the axis around which the cap rotates. Likewise, the terms "front" and "rear" are considered in reference to the movement of a point of the cap along the rotation direction.

The outlet of said through orifices emerges on the radially outer wall of the cap. By deflecting the oil jet tangentially at the outlet of the orifices of the rotating cap, the radial component of the jet, which is poorly controlled, disappears. Furthermore, the speed of the jet is added to the peripheral speed at the outlet of the through orifice. The oil jets leaving the cap therefore have a better controlled orientation. Furthermore, the tangential impulse of the oil sprayed on the inner wall of the enclosure is stronger. The conditions are therefore met to improve the overall rotation of this oil against the wall of the enclosure and limit splashes.

Advantageously, the deflecting means are arranged to form a screen in the radial direction at said outlet.

Advantageously, the deflecting means are arranged to form a bend at the outlet of each orifice, including a discharge conduit of the oil oriented in said tangential direction.

Preferably, the deflecting means for each orifice include a cover placed at the outlet of said orifice.

Preferably, said cover includes a part separated from the outer wall of the cap that extends substantially tangentially toward the front of said orifice along the rotation direction of the cap.

Advantageously, the radial extension of said cover is smaller than its tangential extension.

Thus, the deflecting means can be made simply and compactly. The wall of the collection enclosure can be close to the rotary cap.

Preferably, said orifices are distributed in a transverse plane corresponding to a section of the cap of maximum diameter.

This makes it possible to ensure proper guiding by spinning of the oil inside the cap to discharge it.

Advantageously, said orifices form small, substantially radial orientation lines in a wall thickness of said cap. The radial orientation is useful to collect the oil by spinning. Furthermore, maintaining this orientation of the extension of the line makes production easy by machining means. Preferably, the through orifices are arranged in a maximum thickness zone of the wall of the cap. This makes it possible to elongate the small lines and better drive the oil passing through these lines.

The cap can be surrounded by a band that covers all of said orifices, and the oil deflecting means can be formed by open pockets in said band, for example obtained by stamping.

The cap can include two annular shells assembled by annular flanges in a transverse plane, said flanges being arranged to define said through orifices between them.

Advantageously, the flanges define two annular grooves facing one another and arranged to hold said band. This pools the assembly means of the cap and means for fastening that the deflecting means on the cap.

The invention also relates to an assembly comprising turbomachine equipment and a cap as previously described, said equipment for example being a reduction gear, as well as a turbomachine including such a cap and/or such an assembly.

BRIEF DESCRIPTION OF THE FIGURES

The present invention will be better understood and other details, features and advantages of the present invention will appear more clearly upon reading the following description of one non-limiting example, in reference to the appended drawings, in which:

FIG. 1 schematically shows a turbomachine module according to the prior art including rotary equipment, an annular cap and an annular case, here in section along a half-plane passing through the rotation axis of the equipment;

FIG. 2 shows a schematic cross-section along plane P of the cap and the annular case of the module of FIG. 1, according to the state of the art;

FIG. 3 shows a schematic cross-section along plane P of the cap and the annular case of the module of FIG. 1, modified according to the invention;

DETAILED DESCRIPTION OF THE INVENTION

Figures 4, 5:
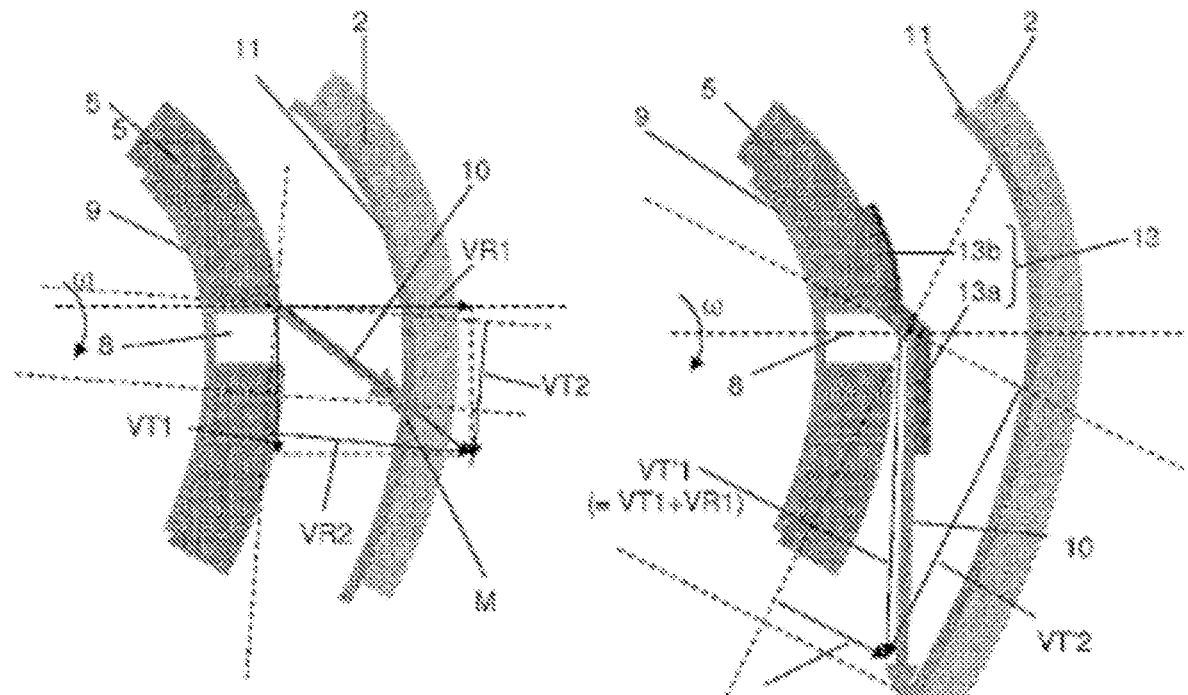
FIG. 4 is an enlargement of part B of FIG. 2 for a module according to the state of the art.
FIG. 5 is an enlargement of part B' of FIG. 3 for a module modified according to the invention.

FIG. 1 shows a turbomachine equipment 1, mounted in an enclosure 2 and rotatable around an axis A. Generally, the walls of the enclosure 2 are formed by at least one annular case 2 extending around the equipment 1.

This equipment 1 is for example a reduction gear of the PGB type. An oil inlet, not shown in the figure, provides oil in the central region of the PGB to lubricate it. This oil traverses various active parts of the PGB, such as gears, by spinning. These parts are shown schematically in the figure by inner active parts 3a and 3b rotating in one direction, and surrounded by an outer part 4, rotating in the opposite direction or stationary, depending on the case.

In this example, in the case of a PGB with an epicyclic gear train, the innermost part 3b shows a planetary gear input shaft in the form of a drive pinion, which is mounted by a cannulated link on a turbine shaft rotating in a rotation direction while driving the PGB. The part 3a shows a planet carrier supporting planet gears, for example three, which mesh around the input shaft 3b. The outer part 4 shows an outer crown that meshes in the planet gears. The dimensional ratios between the various elements are arranged here so that the outer crown 4 rotates in the opposite direction from the input shaft 3b, the planet gears rotating relative to the planet carrier 3a and here rotating it in the same direction as the input shaft 3b, but with a different speed. This brief description illustrates the fact that in such a device, many parts are in contact with relative movements and significant forces, which requires a large quantity of oil for lubrication and cooling.

The entire PGB is confined in a rotary outer annular cap 5. This cap 5 here is secured to the inner part 3a and therefore rotates in the direction opposite the outer part 4 of the PGB 1 with a given speed w. The cap 5 extends around and at a distance from the active part 4 to form an inner cavity 6 that serves, inter alia, to receive lubricating oil leaving the PGB 1 by spinning.

The oil having lubricated and cooled the active parts 3a, 3b and 4 of the PGB 1 can leave them via different paths 7a, 7b, 7c. The outer cap 5 is configured to guide the oil coming from these different paths toward outlet orifices 8. These orifices 8 are advantageously located in a maximum radius zone of the cap 5 to favor the discharge of the oil by spinning. Furthermore, there are generally several of them, and they are generally uniformly distributed on the circumference in a plane P perpendicular to the rotation axis A.

As shown in FIG. 2, this oil tends, under the effect of the centrifugal force, to form an annular film 9 driven by the cap 5, rotating in the figure at the speed w, clockwise.

Advantageously, the orifices 8 are formed in a relatively thick zone of the cap 5. They thus form small lines 8, the orientation of which is substantially radial relative to the rotation axis A. The oil escaping by spinning through these small lines 8 is therefore rotated by the walls of these small lines 8 and is sprayed toward the inner wall of the case 2, along jets 10, in a direction resulting from a radial and tangential component. This contributes to the formation of another annular oil film 11 against the static wall of the case 2. So that the oil does not run, it is interesting for this annular oil film 11 to have a circular overall movement imparted by the jets 10. Thus, the oil remaining pressed against the inner wall of the case 2 can be collected, for example, by a channel 12 emerging on the low point of the case 2.

In reference to FIG. 4, the jet 10 leaves the small line 8 with a tangential speed VT1, perpendicular to the radial direction and corresponding to the tangential speed of the wall of the cap 5 at the outlet, because it is driven by the rear part, relative to the rotational movement ω, of the wall of the small line 8. Furthermore, the jet 10 has a radial component VR1, substantially equal to the oil flow passing through the small line 8 divided by the section of the jet 10.

The jet 10 encounters the inner wall of the case 2 at a point M, slightly in front of the outlet of the small line 8. At the impact point M, the value of the tangential component VT2 on the wall of the case 2, perpendicular to the radial direction at the impact point M, is slightly lower than that of the tangential speed VT1 relative to the cap 5 at the outlet of the small line 8, and the radial component VR2 on the case 2 is slightly higher than that of the radial output speed VR1 on the cap 5.

The radial component VR2 of the speed of the jet 10 at the impact point M does not participate in rotating the annular film 11. Furthermore, it risks causing splashes when the jet 10 strikes the wall of the case 2, and thus dispersing the oil in the enclosure or on the cap 5. Furthermore, as previously stated, the section of the small lines 8 is significantly larger than the section of the oil jet generally being discharged through these small lines 8, so as to avoid the risk of oil retention inside the cap 5. The radial speed VR1 of the jet 10, which makes up the majority of the radial speed VR2 at the impact point, is therefore not well known.

According to the invention, in reference to FIGS. 3 and 5, a device 13 deflecting the jet 10 is placed at the outlet of each small line 8. According to one embodiment schematically shown in FIG. 5, the deflecting means 13 may essentially include a cover 13a placed across from the outlet of the small line 8, part of which is substantially parallel to the tangent to the cap 5 at said outlet. Furthermore, a rear part of the cover 13a, in the rotation direction of the cap 5, forces the oil to flow toward the front, reaching the outer wall of the cap 5 near the rear edge of the outlet opening of the small line 8. This cover 13a forms a screen in front of the opening of the small line 8 in the radial direction and extends toward the front wall, forming, with the outer wall of the cap 5, a tangential conduit extending toward the front, along the rotation direction of the cap 5. The radial distance from the cover 13a to the cap 5 remains below a value substantially equivalent to a diameter or a transverse dimension of the outlet section of the small line 8.

Furthermore, this deflecting means 13 includes at least one rear part 13b, along the rotation direction of the cap 5, that preferably extends along the cap 5 enough to make it possible to adapt a fastening means, such as a screw or clip.

Such a deflecting means can for example be formed by stamping a metal sheet to thus form a cover 13a covering the outlet orifice of the small line 8 and the fasteners 13b.

As illustrated in FIG. 5, with this deflecting means 13, the jet 10 exits tangentially to the cap 5, at the outlet of the small line 8 via the conduit formed with the cover 13a. Furthermore, the tangential outlet component VT'1 of the cover 13, perpendicular to the radial direction, is increased, relative to its initial value VT1, by the initial radial speed VR1 related to the oil flow rate in the jet 10. Consequently, when the oil reaches the impact point M' on the inner wall of the case 2, it has, compared to the previous scenario, a higher tangential speed VT'2, perpendicular to the radial direction at the point of impact M, and a lower radial speed VR'2 than without the cover 13. Gains are thus made both in terms of setting the oil in rotation against the wall of the case 2 and decreasing the splash risk.

The principle of the invention has been described here with one particular embodiment of the deflecting means 13 tangential to the jet 10. One skilled in the art may easily conceive of different adaptable means at the outlet of a small line 8 in the cap 5 to extend the latter by a bent part, the opening of which is oriented forward, in the direction of the rotation speed of the cap 5.

Figures 6, 7:
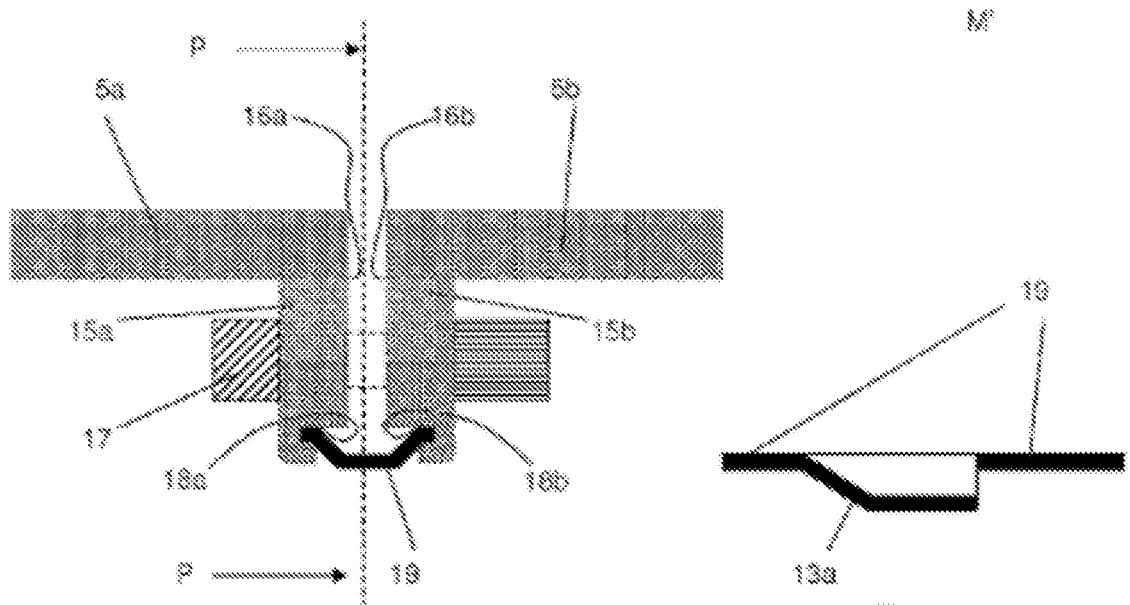
FIG. 6 is a sectional view along a meridian plane of an assembly flange of an annular cap according to the invention.
FIG. 7 is a schematic sectional view along plane P of FIG. 6, at the element 19.

One advantageous embodiment is shown, in reference to FIG. 6, in the scenario where the cap 5 includes two annular shells 5a, 5b, assembled in the axial direction along an assembly plane transverse to the rotation axis A. Preferably, the assembly plane corresponds to the transverse plane P where the small lines 8 are located.

Here, the shells 5a, 5b are assembled by flanges comprising a transverse ring 15a at the end of a first shell 5a and a transverse ring 15b at the end of the other shell 5b. Traditionally, each flange ring 15a, 15b extends radially over a distance greater than the thickness of the shells, one 15a having a transverse face 16a cooperating with a transverse face 16b of the other flange ring 15b to close the space between the two rings 15a, 15b and secure them. The two faces 16a, 16b are pressed against one another by bolts or screws 17. The mechanical retention of the two shells 5a, 5b against one another is provided by the radial extension of the flange rings 15a, 15b.

In this embodiment, the transverse faces 16a and 16b of the flange rings 15a, 15b are machined so as to leave spaces between them that form the small radial lines 8, as shown by the sectional view along a meridian plane passing through one of these lines 8, in FIG. 6.

One can see here that aside from the fact that the interface between the flanges 15a, 15b is in a convenient location to produce the oil passages 8 through the cap, the flanges 15a, 15b also form a maximum thickness zone of the cap 5, due to the radial extension of the rings 15a, 15b. The small lines 8 therefore have a greater radial extension than if they were formed elsewhere, which allows them to drive the oil more effectively in the rotational movement of the cap 5.

Furthermore, in this embodiment, each flange ring 15a, 15b includes, at its radial end, a circumferential groove 18a, 18b, oriented axially and turned toward the interface between the flanges 15a, 15b. A corresponding band 19 is installed on the periphery of the flange rings 15a, 15b and is fastened against them by inserting its lateral edges into said grooves 18a, 18b. This band 19 can form additional sealing means across from the seam between the two flange rings 15a, 15b. Advantageously, the band 19 has a larger radius in its central part, such that the oil is more concentrated in the center.

The covers 13a of the deflecting means are formed on this band across from each small line 8 of the flange 15. This band therefore preferably includes an angular index in order to ensure positioning of the pockets across from each small line. Their shape in sectional view along the transverse plane P, in reference to FIG. 7, corresponds to the principle of what was described for FIG. 5.

The band 19 forming a strip, said covers 13 can for example easily be formed by stamping on this strip before it is fastened to the flanges 15a, 15b.

The invention claimed is:

1. An annular cap for collecting lubricating oil for turbomachine equipment, said cap being configured to extend around said turbomachine equipment and to rotate around an axis, the cap including through-orifices through which the oil passes radially under the effect of spinning, wherein the cap includes deflecting means for deflecting the oil leaving said orifices, arranged to give the oil an exit speed oriented in a direction substantially transverse to the axis and substantially perpendicular to the radial direction, at said outlet, said deflecting means comprise a first portion mounted on an external surface of the cap and a second portion which extends in a direction perpendicular to the radial direction.

2. The cap according to claim 1, wherein the deflecting means are arranged to form a screen in the radial direction at said outlet.

3. The cap according to claim 2, wherein the deflecting means are arranged to form a bend at the outlet of each orifice, including a discharge conduit of the oil oriented in said tangential direction.

4. The cap according to claim 3, wherein the second portion is placed at the outlet of said orifice.

5. The cap according to claim 4, wherein the radial extension of said second portion is smaller than its tangential extension.

6. The cap according to claim 1, wherein the cap has a section defined in a transverse plane and which has a maximum diameter, said orifices being distributed in said transverse plan.

7. The cap according to claim 1, wherein said orifices form small lines having substantially radial orientation in a wall thickness of said cap.

8. The cap according to claim 1, including two annular shells assembled by annular flanges in a transverse plane, said flanges being arranged to define said through orifices between them.

9. The cap according claim 8, wherein the flanges define two annular grooves facing one another and arranged to hold said band.

10. An assembly comprising turbomachine equipment and a cap according to claim 1.

11. A turbomachine according to claim 10, wherein the turbomachine a casing surrounding the cap and which forms the wall of an enclosure in which the turbomachine equipment is installed, the turbomachine equipment comprises a reduction gear.

12. The cap according to claim 7, wherein said cap is surrounded by a band that covers all of said orifices, and wherein the oil deflecting means can be formed by open pockets in said band, the open pockets in said band being formed by stamping.

13. The cap according to claim 8, wherein the transverse plan is perpendicular to the axis.

14. The assembly according to claim 10, wherein the cap extends around and at a distance from the active part of the equipment to form an inner cavity.

15. The cap according to claim 1, wherein the second portion is parallel to the tangent to the cap.

16. The assembly according to claim 10, second portion forms with an external surface of the equipment a tangential conduit.

17. The cap according to claim 1, wherein the second portion is placed at a radial distance of the cap which is lower that a diameter or a transversal dimension of an outlet section of the orifice.

18. An annular cap for collecting lubricating oil for turbomachine equipment, said cap being configured to extend around said turbomachine equipment and to rotate around an axis, the cap including through-orifices through which the oil passes radially under the effect of spinning, wherein the cap comprises:
- a band mounted on the cap and which covers the orifices; and
- deflecting means for deflecting the oil leaving said orifices, arranged to give the oil an exit speed oriented in a direction substantially transverse to the axis and substantially perpendicular to the radial direction, at said outlet, wherein the deflection means is provided in the band by forming a second portion which extends in a direction perpendicular to the radial direction.

19. The cap according to claim 18, wherein the orifices cross the cap to an internal surface to an external surface according to the radial direction.

20. An annular cap for collecting lubricating oil for turbomachine equipment, said cap being configured to extend around said turbomachine equipment and to rotate around an axis, the cap including through-orifices through which the oil passes radially under the effect of spinning, wherein the cap includes deflecting means for deflecting the oil leaving said orifices, arranged to give the oil an exit speed oriented in a direction substantially transverse to the axis and substantially perpendicular to the radial direction, at said outlet,
wherein at least one band is mounted on the cap and covers at least one orifice of said orifices,
wherein the deflection means is provided in said at least one band by forming a second portion which extends in a direction perpendicular to the radial direction,
the radial extension of said second portion is smaller than its tangential extension.

21. The cap according to claim 20, wherein the band is annular and covers all the orifices.

22. The cap according to claim 18, including two annular shells assembled by annular flanges in a transverse plane, said flanges being arranged to define said through orifices between them.

23. The cap according claim 22, wherein the flanges define two annular grooves facing one another and arranged to hold said band.

24. The cap according to claim 1, wherein the orifices cross the cap to an internal surface to an external surface according to the radial direction.

* * * * *

UNITED STATES PATENT AND TRADEMARK OFFICE
CERTIFICATE OF CORRECTION

PATENT NO. : 10,738,654 B2
APPLICATION NO. : 15/521854
DATED : August 11, 2020
INVENTOR(S) : C. Pikovsky et al.

Page 1 of 1

It is certified that error appears in the above-identified patent and that said Letters Patent is hereby corrected as shown below:

In the Claims

| Column | Line | |
|--------|------|---|
| 6 | 49 | change "turbomachine a" to -- turbomachine has a -- |
| 6 | 65 | change "second" to -- wherein the second -- |
| 7 | 3 | change "that" to -- than -- |

Signed and Sealed this
Fifth Day of July, 2022

Katherine Kelly Vidal
*Director of the United States Patent and Trademark Office*